(12) United States Patent  (10) Patent No.: US 7,508,612 B2
Biskeborn et al.  (45) Date of Patent: Mar. 24, 2009

(54) ASPERITY DATA STORAGE SYSTEM, METHOD AND MEDIUM

(75) Inventors: Robert G. Biskeborn, Hollister, CA (US); Gary M. Decad, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/765,295

(22) Filed: Jun. 19, 2007

(65) Prior Publication Data

US 2007/0242382 A1  Oct. 18, 2007

Related U.S. Application Data

(63) Continuation of application No. 11/260,049, filed on Oct. 27, 2005, now Pat. No. 7,265,922.

(51) Int. Cl.
G11B 5/02 (2006.01)
G11B 21/02 (2006.01)

(52) U.S. Cl. .......................................... 360/55; 360/75
(58) Field of Classification Search ....................... None
See application file for complete search history.

(56) References Cited

U.S. PATENT DOCUMENTS

| | | | |
|---|---|---|---|
| 5,739,972 A | 4/1998 | Smith et al. | |
| 5,793,207 A | 8/1998 | Gill | |
| 5,793,576 A | 8/1998 | Gill | |
| 5,898,535 A | 4/1999 | Kawai | |
| 6,019,503 A * | 2/2000 | Abraham et al. | 374/4 |
| 6,034,829 A | 3/2000 | Suzuki et al. | |
| 6,088,176 A | 7/2000 | Smith et al. | |
| 6,104,563 A | 8/2000 | Dovek et al. | |
| 6,262,572 B1 | 7/2001 | Franco et al. | |
| 6,433,951 B1 | 8/2002 | Lubratt | |
| 6,757,126 B1 | 6/2004 | Kuroda et al. | |
| 6,785,079 B2 | 8/2004 | Brannon et al. | |
| 6,856,484 B2 | 2/2005 | Johnson et al. | |
| 6,868,048 B1 * | 3/2005 | McDaniel et al. | 369/13.06 |
| 7,265,922 B2 * | 9/2007 | Biskeborn et al. | 360/55 |

* cited by examiner

*Primary Examiner*—K. Wong
(74) *Attorney, Agent, or Firm*—Walter W. Duft; Jeffrey P. Aiello

(57) ABSTRACT

An asperity data storage system wherein asperities are used to represent stored data. The asperity data storage system includes an asperity transducer that thermally interacts with a data storage medium adapted to store an information-encoded pattern of asperities thereon, such as a rotatable disk, a streamable tape, or a fixed medium. A drive system produces relative motion between the data storage medium and the asperity transducer, while electrical signals corresponding to the asperities are processed as stored information. A positional relationship can be maintained between the asperity transducer and the data storage medium using the asperities on the data storage medium for reference. A related asperity data storage method and the asperity data storage medium itself are further disclosed.

10 Claims, 9 Drawing Sheets

ASPERITY DATA STORAGE SYSTEM, METHOD AND MEDIUM

CROSS-REFERENCE TO RELATED APPLICATIONS

This application is a continuation of application Ser. No. 11/260,049, filed on Oct. 27, 2005, and entitled "Asperity Data Storage System, Method And Medium."

BACKGROUND OF THE INVENTION

1. Field of the Invention

This invention relates to data storage systems, such as disk drives, tape drives and the like. More particularly, the invention is directed to a new form of data storage system that does not rely on magnetic, optical or magneto-optical means to store and retrieve information.

2. Description of the Prior Art

By way of background, data storage systems such as disk drives and tape drives conventionally implement magnetic, optical or magneto-optical recording and playback techniques to store and retrieve information on a passive storage medium. Magnetic storage devices utilize magnetic domains on a magnetic storage medium to represent stored data. During data readback operations, a magneto-resistive read head senses changes in the magnetic moments of the magnetic domains and generates a readback signal corresponding to the recorded information. Optical storage devices utilize pits formed on an optical storage medium to represent stored data. During data readback operations, an optical read head directs a laser light beam onto the storage medium. When the pits are encountered, the phase of the reflected light changes and produces a readback signal corresponding to the recorded information. Magneto-optical storage devices utilize perpendicularly oriented magnetic domains on a magneto-optical storage medium to represent stored data. During data readback operations, a read head directs a laser light beam onto the storage medium. The magnetic domains on the medium rotate the polarization vector of the incident light beam upon reflection, thus producing a readback signal corresponding to the recorded information.

It is to new techniques for storing information that the present invention is directed. In particular, instead of employing conventional magnetic, optical and magneto-optical storage methods as described above, a data recording and playback system that relies on head-media physical (including contact) interactions is considered for use in a data storage system.

SUMMARY OF THE INVENTION

The present invention presents an asperity data storage system (having read and/or write components), a method and a medium wherein asperities are used to represent stored data. In accordance with one aspect of the invention, an asperity data storage system includes an asperity transducer for thermally interacting with a data storage medium adapted to store an information-encoded pattern of asperities thereon. A drive system produces relative motion between the data storage medium and the asperity transducer by moving the data storage medium relative to the asperity transducer or visa versa. Channel circuitry processes electrical signals corresponding to the asperities as stored information. The foregoing system can be implemented to operate with either a removable data storage medium or a non-removable data storage medium constructed as part of the system. Transducer positioning circuitry can be provided to control a positional relationship between the asperity transducer and the data storage medium using the asperities on the data storage medium for reference.

The asperity data storage system of the invention can be implemented as a data retrieval system, with the asperity transducer comprising an asperity reader. In an exemplary construction, the asperity reader can be fabricated as a thin-film structure having a substrate layer, a first insulative layer on the substrate layer, a sensor layer on the first insulative layer, a second insulative layer on the sensor layer, and a closure layer on said second insulative layer.

The asperity data storage system of the invention can also be implemented as a data recording system, with the asperity transducer comprising an asperity writer. In an exemplary construction, the asperity writer can be fabricated as one of a laser writer, an imprinting writer, a laser print head writer, and an ink jet print head writer. The foregoing may be adapted to operate on a nano-scale, such that high density asperities are formed using techniques such as nano-imprinting, nano-indenting, nano-particle deposition, etc.

The asperity transducer can be constructed as a combined asperity reader and an asperity writer, such that the asperity data storage system functions as both a data retrieval and recording system.

In further exemplary constructions, the data storage system of the invention can be implemented as an asperity disk drive in which the data storage medium comprises a rotatable disk and the asperity transducer is mounted on a slider carried by an actuator arm. Alternatively, the asperity data storage system of the invention can be implemented as an asperity tape drive in which the data storage medium comprises a streamable tape and the asperity transducer is mounted on a tape head or on a helical scanning drum.

In accordance with another aspect of the invention, an asperity data storage method is provided in which an information-encoded pattern of asperities on a data storage medium is used to represent stored information, and thermal interactions with the asperities are used to transduce the information. In accordance with this method, asperities on the data storage medium may further be used as a reference for maintaining a positional relationship between an asperity transducer and the data storage medium. The foregoing method can be used to implement a data retrieval operation wherein the asperity pattern is read from the data storage medium. The method can also be used to implement a data recording operation wherein the asperity pattern is written to the data storage medium. The storage medium could be a rotatable disk, a streamable tape, or a fixed medium.

In accordance with a further aspect of the invention, a data storage medium is provided in which an information-encoded pattern of asperities is used to represent stored information. The asperities are constructed to thermally interact with a sensor whose electrical resistance is temperature dependent. Asperities on the data storage medium may be further used as a reference for maintaining a positional relationship between a transducer and the data storage medium. The data storage medium can be implemented as a non-removable or removable disk, a tape, or otherwise.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF EXEMPLARY EMBODIMENTS

I. Introduction

Figure 1A:
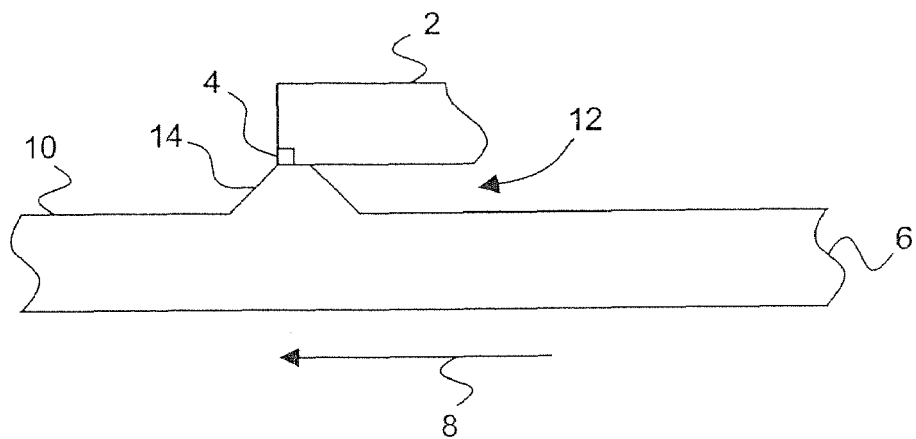
FIGS. 1A, 1B and 1C are diagrammatic illustrations depicting different kinds of asperities that are known to affect conventional magnetic storage devices.

The invention will now be described by way of exemplary embodiments shown by the drawing figures (which are not necessarily to scale), in which like reference numerals indicate like elements in all of the several views.

Figure 1B:
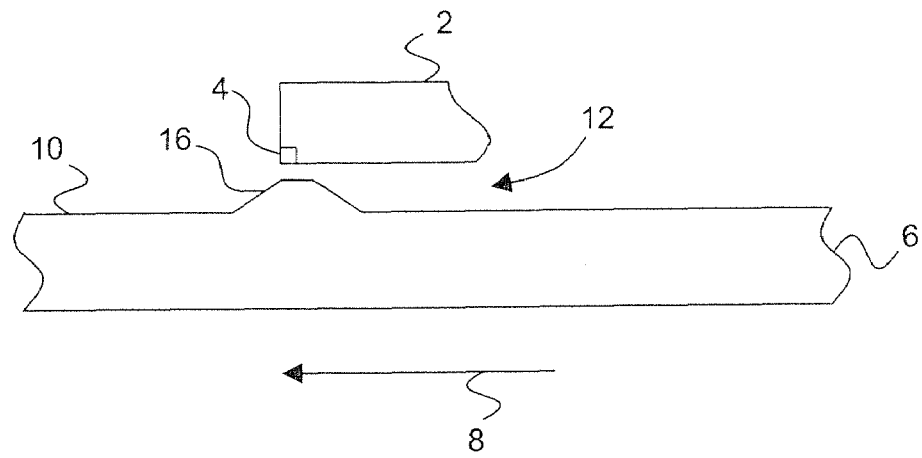
Figure 1C:
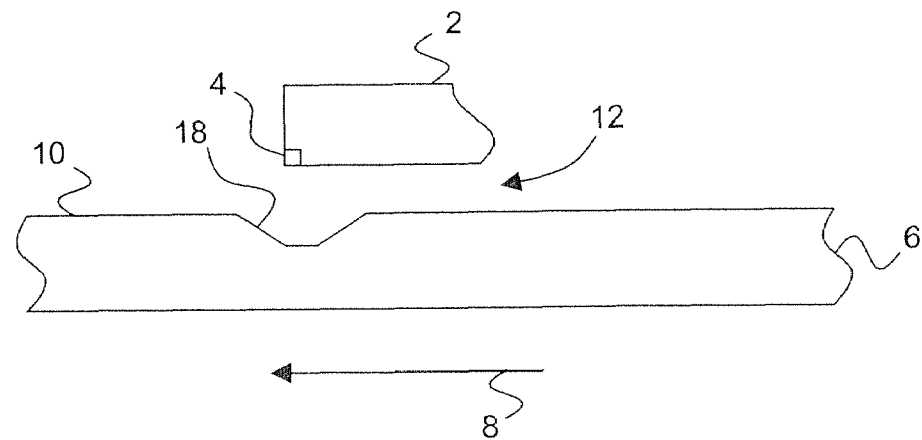

Turning to FIGS. 1A, 1B and 1C, a discussion of asperities and their effect on magnetic head-media interactions will be briefly set forth to acquaint the reader with physics principals underlying operation of the present invention. In FIG. 1A, a magnetic disk drive slider 2 carries a read/write head 4 that is assumed to incorporate a magneto-resistive read element and a magneto-inductive write element. As the disk 6 rotates in the direction of the arrow 8, the slider 2 is carried on an air bearing that causes the head 4 to be positioned at a very small distance from the nominal upper disk surface 11. This distance is referred to as the flying height of the slider 2 and is shown by reference numeral 12. The distance 12 can also be referred to as the head-disk air gap.

It will be seen in FIG. 1A that the disk 6 is not perfectly flat or smooth. Rather, as is well known in the disk drive art, the disk 6 will normally have a number of irregularities on its upper surface. One of these is shown as a raised protruberance 14 that extends above the nominal upper disk surface 10. As the disk 6 rotates beneath the slider 2 and the slider is moved around from track to track during read/write operations, the protruberance 14 will at some point pass under the read/write head 4. If the protruberance 14 is tall enough, it will cause contact between the disk and the read/write head 4. This contact may cause frictionally induced heating of the read/write head 4. Such heating will cause the magneto-resistive read element of the read/write head 4 to experience a proportional increase in resistance local to the point of contact. The effect of this frictionally induced heating and resistance increase is to produce a momentary change in readback signal, which is considered undesirable in conventional magnetic disk drives. In the disk drive art, an imperfection on a magnetic disk surface that causes contact with a read/write head, such as the protruberance 14, is sometimes referred to as a "contact thermal asperity" or "contact TA."

FIG. 1B illustrates the same components as shown in FIG. 1A, the only difference being that there is a smaller raised protruberance 16 on the disk 6 instead of the larger protruberance 14. The protruberance 16 is small enough that its does not cause contact between the disk and the read/write head 4. However, the protruberance 16 produces changes in readback signal strength by changing the thermodynamic equilibrium between the read/write head 4 and the disk 6. This thermodynamic equilibrium is achieved as a result of heat generated by the magneto-resistive read element of the read/write head 4 during read operations being dissipated (in part) across the air gap 12 to the disk 6 at a relatively constant rate (provided the size of the air gap is relatively constant). The protruberance 16 upsets the thermal equilibrium by reducing the size of the air gap 12 as the protruberance passes under the read/write head 4. This allows more heat to dissipate from the magneto-resistive read element to the disk 6, causing a momentary decrease in read element temperature, and a proportional decrease in resistance. The effect of this cooling and resistance decrease is to produce a momentary change in readback signal. In the disk drive art, a raised imperfection on a magnetic disk surface that is not large enough to cause contact with a read/write head 4, such as the protruberance 16, is sometimes referred to as a "positive non-contact thermal asperity" or "positive non-contact TA." The protruberance 16 may also be referred to as a "cooling asperity," insofar as it produces read element cooling.

FIG. 1C illustrates the same components as shown in FIGS. 1A and 1B, the only difference being that there is a depression 18 on the disk 6 instead of a protruberance 14 or 16. The depression 18 produces changes in readback signal strength in a manner that is analogous to the effect produced by the non-contacting protruberance 16, except with an opposite result. In particular, the depression 18 upsets the thermal equilibrium between the read/write head 4 and the disk 6 by increasing the size of the air gap 12 as the depression passes under the read/write head 4. This allows less heat to dissipate from the magneto-resistive read element to the disk 6, causing a momentary increase in read element temperature, and a proportional increase in resistance. The effect of this heating and resistance increase is to produce a momentary change in readback signal strength. In the disk drive art, a low spot on a magnetic disk surface, such as the depression 18, is sometimes referred to as a "negative non-contact thermal asperity" or "negative non-contact TA." The depression 18 may also be referred to as a "heating asperity," insofar as it produces read element heating.

Figure 2:
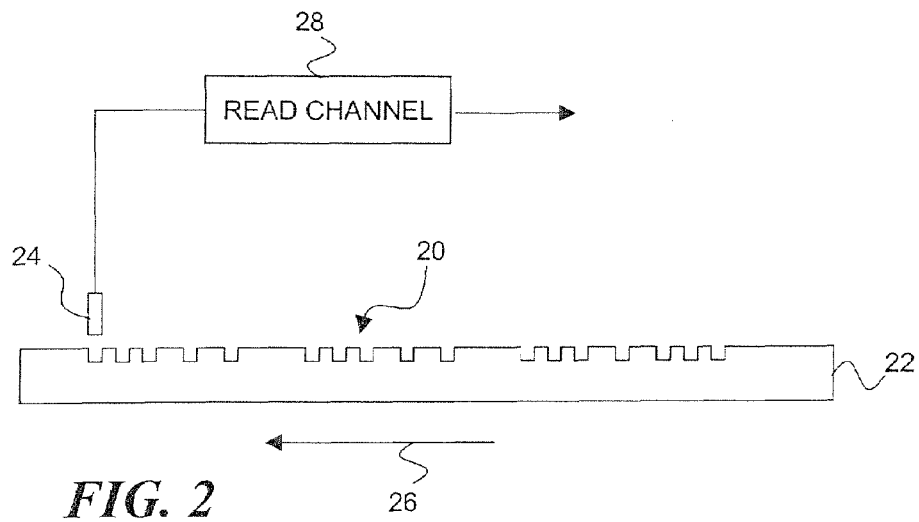
FIG. 2 is a diagrammatic illustration of an asperity reader in accordance with the present invention that reads an information-encoded pattern of asperities on a data storage medium.

Turning now to FIG. 2, the present invention contemplates a new form of data storage wherein asperities (positive or negative, contacting or non-contacting), shown by reference numeral 20, are purposely placed on a storage medium 22 in an encoded pattern in order to influence an asperity reader 24 in close proximity thereto. More particularly, as the storage medium moves in the direction of the arrow 26 (this direction being arbitrary), each asperity 20 will cause an impulsive (e.g., approximately 1 microsecond) temperature change in the asperity reader 24 that produces a proportional change in resistance and a corresponding change in readback signal. The change in readback signal can be processed by a read channel 28 that is adapted to interpret the change as information to produce an output representing information corresponding to the encoded pattern of asperities 20 on the medium 22. The read channel 28 can be based on the design of a conventional disk drive or tape drive read channel. However, modifications are required so that the thermal asperity readback signal is isolated, amplified and otherwise processed to provide the desired information signal, instead of being filtered out or otherwise eliminated, as is common in conventional read channel circuitry.

The asperities 20 represent discrete regions on the medium surface that are elevated or depressed relative to the neighboring surface. They can be localized, typically to a few micrometers or less. Ideally, the asperities 20 are durable in the sense that they are not worn down during use. As described in more detail below, the asperities 20 can be formed using several methods, each of which produces asperities having unique characteristics.

II. Asperity Reader

The asperity reader 24 can be implemented using a temperature sensitive thin film resistor, the electrical resistance of which increases or decreases during the thermal event. As discussed relative to FIGS. 1A-1C, a conventional magneto-resistive read head typically has temperature-dependent electrical resistance properties and thus could be used to provide the sensing portion (sensor) of the asperity reader 24. Exemplary materials that may be used to provide the sensor include tantalum (Ta) and platinum (Pt).

Figure 3:
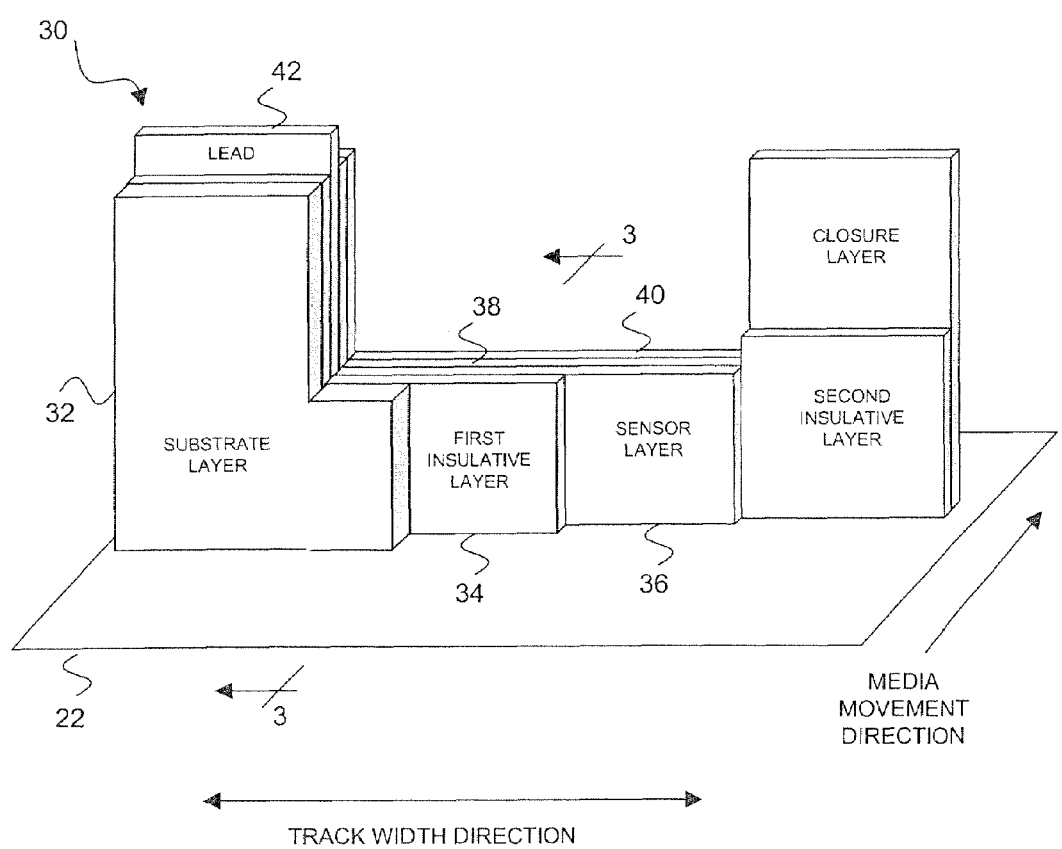
FIG. 3 is a perspective view of an exemplary construction of the asperity reader of FIG. 2.

FIG. 3 illustrates an exemplary design 30 that may be used to construct the asperity reader 24 for use in either a disk drive or a tape drive implementation of the invention. The asperity reader design 30 is based on thin film fabrication techniques of the type commonly used to construct magneto-resistive read elements. A multilayer structure is thus contemplated wherein a hard disk drive-type ceramic substrate material such as Aluminum Oxide-Titanium carbide (AlTiC) is used to form as a relatively thick ceramic substrate layer 32. An insulative material such as alumina is deposited onto the ceramic substrate layer 32 to form a relatively thin first insulative layer 34. A sensor layer 36 (sensor) having a temperature-dependent electrical resistance is formed on the first insulative layer 34. As indicated above, the sensor 36 can be fabricated using tantalum, platinum or any other material with suitable resistive properties. A relatively thin second insulative layer 38 is formed on the sensor 36. A thin closure layer 40 made from (for example) hard ceramic similar to the substrate material or the like is formed on or bonded to the insulative layer 38. The thicknesses of the various layers 32-40 of the asperity reader design 30 can be selected according to design requirements and taking into account the relative heat transfer characteristics of the materials chosen. A linear temperature-resistance profile for the asperity reader 24 is acceptable, but is not required insofar as appropriate compensation circuitry can be provided in the read channel 28 to provide a desired readback signal.

The thermal pulse amplitude for a cooling asperity on the medium 22 is a function of the power dissipation of the sensor 36, the thermal diffusivity of the sensor plus neighboring films, and the detailed shape of the asperity itself. For example, for a given cooling asperity, the time constant for temperature change (ignoring the temperature rise of the asperity itself) is calculated by the product R*C, where R is the parallel combination of the thermal resistance between the sensor 36 and the remainder of the asperity reader 24 and the characteristic thermal resistance for heat flow from the sensor 36 into the asperity (e.g., in degrees Celsius per watt), and where C is the characteristic heat (thermal) capacity of the sensor 36 (e.g., in Joules per degree Celsius). The characteristic thermal resistance value R is (in part) a function of the thermal resistance of the gap between the sensor and the medium 22. The characteristic heat capacity value C indicates the ability of the sensor 36 to store heat and represents the amount of energy required to raise the temperature of the sensor by one degree, or conversely, the amount of energy that needs to be transferred out of the sensor 36 to drop its temperature by one degree. The time constant for temperature change (R*C or RC) is the time required for the sensor 36 to reach 63.2% of its maximum temperature differential when undergoing a temperature change event. High diffusivity corresponds to low RC. For the sensor 36, a high thermal diffusivity value (low RC) thus means there will be a rapid large temperature drop in the brief time period that the sensor is influenced by an asperity, which translates to large pulse amplitude.

Figure 3A:
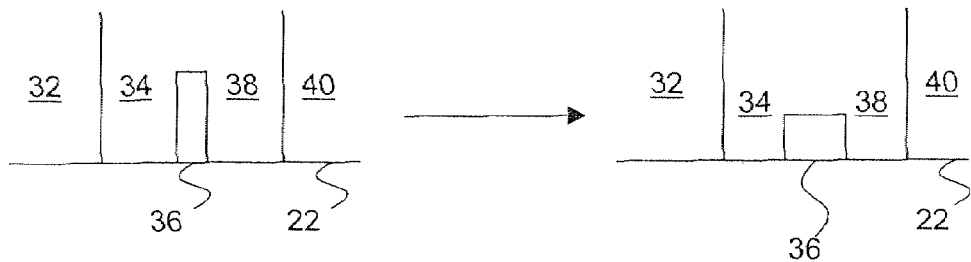
FIG. 3A is a cross-sectional view taken along line 3-3 in FIG. 3 showing alternative sensor layer geometries affecting thermal diffusivity of the FIG. 3 asperity reader.
Figure 3B:
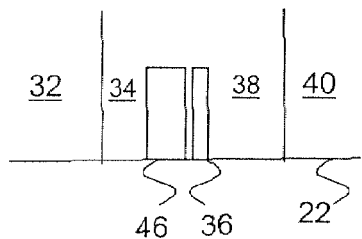
FIG. 3B is a cross-sectional view taken along line 3-3 in FIG. 3 showing the use of an optional heat shield and sensor layer configuration affecting thermal diffusivity of the FIG. 3 asperity reader.
Figure 3C:
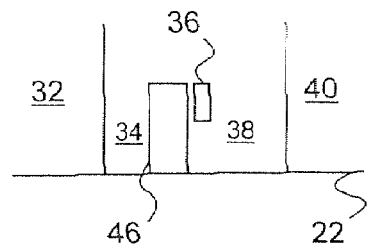
FIG. 3C is a cross-sectional view taken along line 3-3 in FIG. 3 showing the use of another optional heat shield and sensor layer configuration affecting thermal diffusivity of the FIG. 3 asperity reader.
Figure 3D:
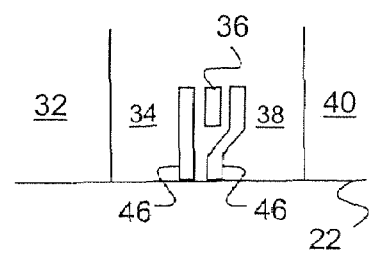
FIG. 3D is a cross-sectional view taken along line 3-3 in FIG. 3 showing the use of still another optional heat shield and sensor layer configuration affecting thermal diffusivity of the FIG. 3 asperity reader.

The response of the sensor design 30 to cooling asperities can therefore be adjusted by altering its thermal diffusivity. Apart from sensor material selection, the thermal diffusivity of the sensor 36 is largely dictated by its geometry. For example, as shown in FIG. 3A, one way to increase thermal diffusivity is to reduce sensor thermal resistance, for example by increasing the cross-sectional area for heat flow from the sensor to the medium. As shown in FIG. 3B, another way that thermal resistance can be reduced is to provide a heat sink shield 46 in close proximity to the sensor 36. The shield 46 can be a thin film-deposited metal, such as one of the alloys of iron, nickel or cobalt commonly used in magnetic head fabrication, except that the shield does not posses magnetic properties. The sensor 36 transfers heat to the shield 46, and the shield 46 dissipates heat into the medium 22, thereby increasing the thermal diffusivity of the sensor 36, depending on its design. Generally speaking, shield volume and specific heat must be considered when designing for low heat capacity C, for lowering the sensor's RC value. Although not shown in FIG. 3B, a second shield 46 could be placed on the opposite side of the sensor 36, thereby further reducing thermal resistance (like fins on a conventional transistor heat sink). FIG. 3C shows another construction that illustrates the sensor 36 at a location which is recessed from the air bearing surface. In comparison to FIG. 3B, this minimizes the cross-sectional area of the sensor-shield structure at the air bearing surface, thereby allowing higher areal asperity densities on the medium 22. FIG. 3D also shows another recessed sensor construction with shields 46 on both sides of the sensor 36.

Figure 4A:
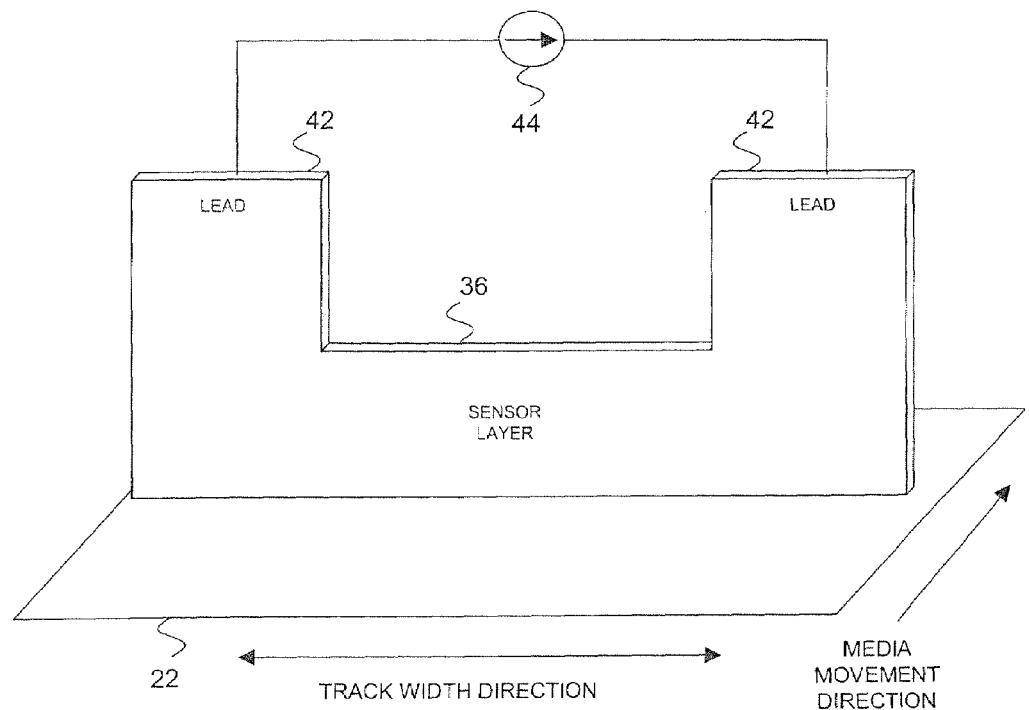
FIG. 4A and FIG. 4B are perspective views of a sensor layer of the asperity reader of FIG. 3 showing changes in voltage drop across the leads thereof when an asperity is proximate thereto.
Figure 4B:
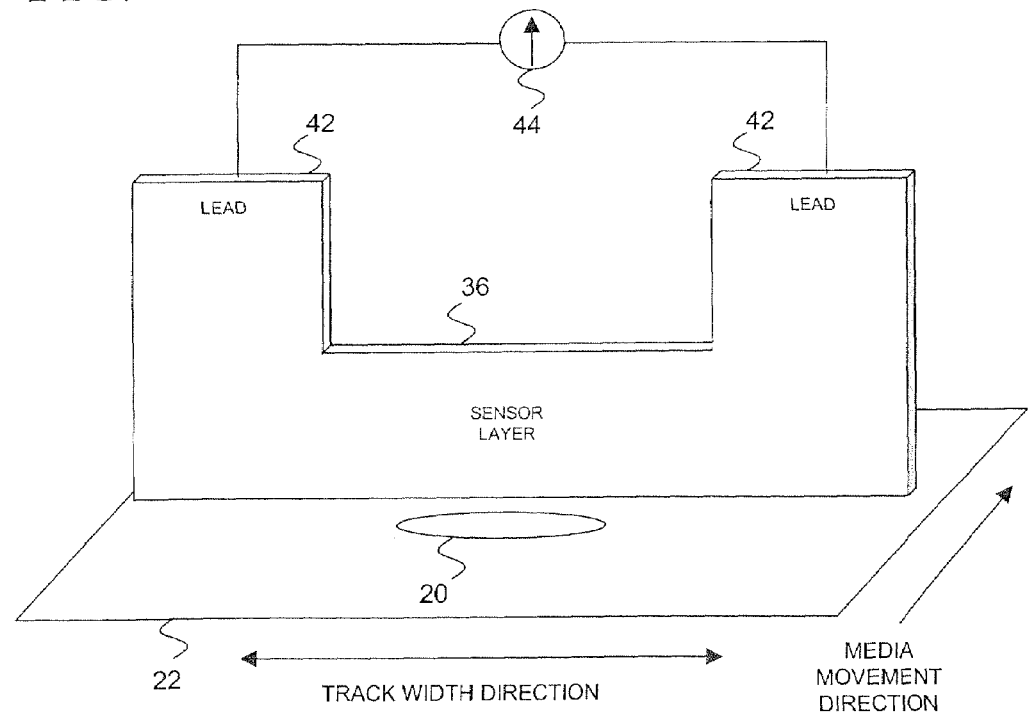

Returning now to FIG. 3, and as further illustrated in FIGS. 4A and 4B, the side portions of the sensor 36 can be extended perpendicularly away from the plane of the medium 22 to provide leads 42 for attachment to a sense current source, such as the read channel 28 (see FIG. 2). When the sense current is applied, a voltage drop will develop across the leads 42 according to the net electrical resistance of the sensor 36. As indicated above, the electrical resistance of the material of the sensor 36 will vary depending on its temperature. FIG. 4A illustrates a first state of the sensor layer 36 wherein there is no asperity proximate thereto on the medium 22. A hypothetical voltmeter 44 placed across the leads 42 indicates a first voltage level. FIG. 4B illustrates a second state of the sensor layer 36 wherein there is an asperity 20 proximate thereto moving at the velocity of the medium 22. The hypothetical voltmeter 44 placed across the leads 42 now shows a second voltage level that is different than the first. In particular, if the sensor 36 has a positive temperature coefficient, and if the asperity 20 is a contact thermal asperity as shown in FIG. 1A, or a negative non-contact thermal asperity as shown in FIG. 1C, the second voltage level will be higher than the first voltage level due to an asperity-induced temperature/resistance increase in the sensor 36. If the asperity 20 is a positive non-contact thermal asperity as shown in FIG. 1B (and the sensor layer 36 has a positive temperature coefficient), the second voltage level will be lower than the second voltage level due to an asperity-induced temperature/resistance decrease in the sensor 36. After the asperity 20 moves past the sensor 36, the effects of the asperity will be quickly removed, the resistance of the sensor will return to its original level, and first voltage level will resume. As persons skilled in the art will appreciate, the read channel 28 can be designed so that the momentary change in voltage level caused by the asperity 20 is interpreted as information, such as a digital "1" or "0."

It should be further understood that the signal response characteristics of the sensor 36 can be controlled by asperity geometry and operating characteristics. Relative to asperity geometry, the height of the asperities 20 will influence readback signal-to-noise ratio. For non-contact asperity configurations, the temperature/resistance change in the sensor 36 will be greatest when positive asperities are tall and negative asperities are deep. Thus, asperity height is a candidate for increasing storage density. For contact asperity configurations, the higher the relative speed between the medium 22 and the sensor 36, the larger the signal. This means that data access burst speeds can be increased without sacrificing performance, and perhaps even increasing performance.

III. Asperity Writer

Figure 5A:
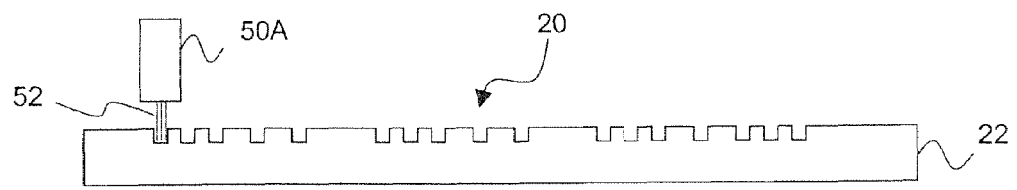
FIGS. 5A, 5B, 5C and 5D are diagrammatic illustrations of alternative constructions of an asperity writer in accordance with the invention that writes an information-encoded pattern of asperities on a data storage medium.
Figure 5B:
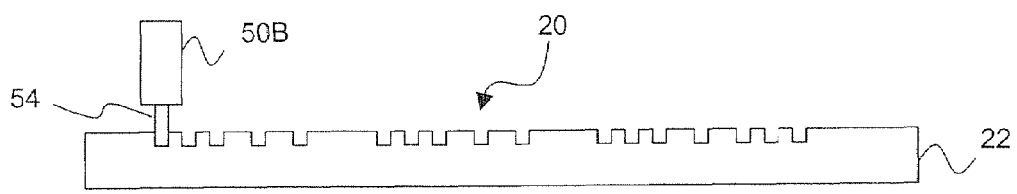
Figure 5C:
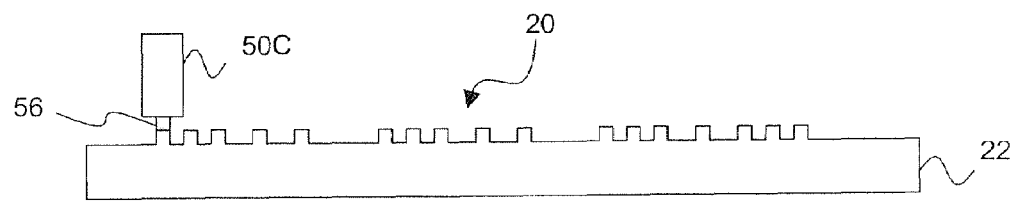
Figure 5D:
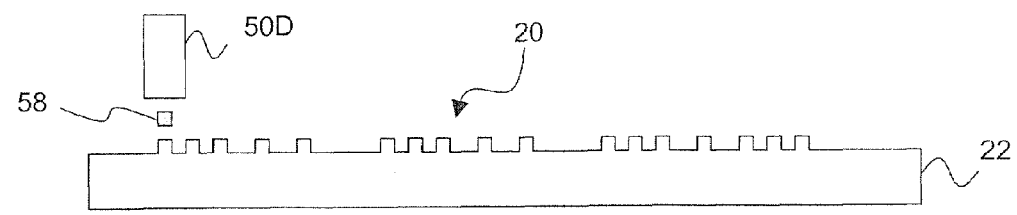

Turning now to FIGS. 5A-5D, there are a number of ways that the asperities 20 can be formed on the medium 22 in accordance with the invention. In FIG. 5A, the asperities 20 are formed using a texturing writer 50A constructed, for example, as a laser writer that directs a laser beam 52 onto the medium 22. The asperities 20 may thus be created by way of laser texturing. This process is best suited for producing negative non-contact asperity configurations (heating asperities), but could also be used to produce contact and positive non-contact asperities (cooling asperities), by removing material on each side of an asperity to be defined. In FIG. 5B, the asperities 20 are formed using an impact writer 50B constructed as an imprinting writer that impresses a stylus 54 into the medium 22. The asperities 20 may thus be created by way of indenting. This process is again best suited for producing negative non-contact asperity configurations (heating asperities), but could also be used to produce contact and positive non-contact asperities (cooling asperities). In FIG. 5C, the asperities 20 are formed using a toner writer 50C constructed as a laser print head that applies toner 56 onto the medium 22 after it has been scanned with a pattern-defining laser. The asperities 20 may thus be created by way of laser toner printing. This process is best suited for producing contact or positive non-contact asperity configurations (cooling asperities), but could also be used to produce negative non-contact asperities (heating asperities) by depositing material on each side of an asperity to be defined. In FIG. 5D, the asperities 20 are formed using an ink jet writer 50D constructed as an ink jet print head that applies ink 58 onto the medium 22. The asperities 20 may thus be created by way of ink jet printing. This process is again best suited for producing contact or positive non-contact asperity configurations (cooling asperities), but could also be used to produce negative non-contact asperities (heating asperities). It will be appreciated that other techniques for forming the asperities 20 may also be used in accordance with the invention.

For any of the foregoing asperity writing techniques, nanotechnology principles may be brought to bear on the asperity formation process. Thus, the laser writer of FIG. 5A, the impact writer of FIG. 5B, the toner writer of FIG. 5C and the inkjet writer of FIG. 5D, may all be constructed using nanofabrication techniques in order to create high density nanoscale asperities. The present invention thus contemplates high density asperities being formed using techniques such as nano-imprinting, nano-indenting, nano-particle deposition, etc. For example, arrays of carbon-60 spheres (so-called "Bucky Balls") may be used for encoding data.

IV. Asperity Data Storage Systems

Figure 6:
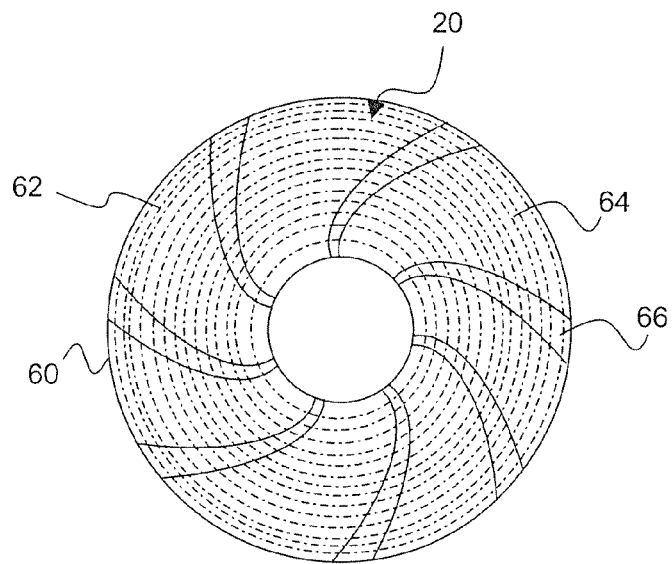
FIG. 6 is a plan view of a data storage disk medium storing an information-encoded pattern of asperities.
Figure 7A:
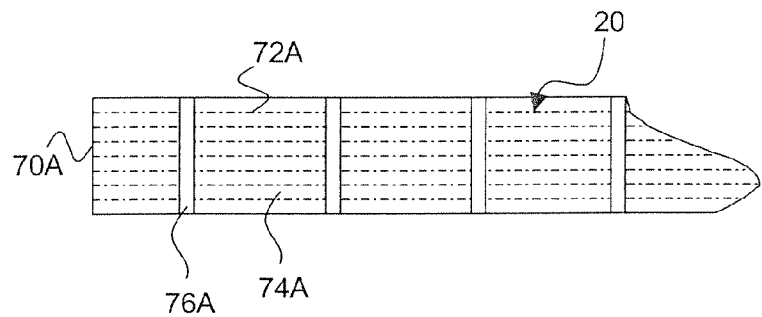
FIG. 7A is a plan view of a data storage tape medium storing a linear information-encoded pattern of asperities.
Figure 7B:
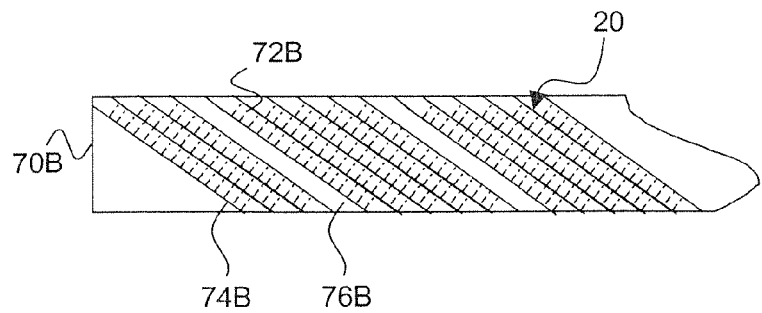
FIG. 7B is a plan view of a data storage tape medium storing a helical information-encoded pattern of asperities.

The principles of the present invention can be embodied in either a disk drive storage system or a tape drive storage system, or perhaps some other data storage system not based on disk or tape media, such as systems in which a storage medium is fixed and a transducing apparatus having one or more transducers moves relative to the medium (e.g., as per the arrangement used in highly parallel very dense AFM data storage systems). FIG. 6 represents an enlarged plan view of a rigid (or flexible) disk medium 60 wherein the asperities 20 shown in FIG. 2 are recorded in concentric tracks 62 in a manner analogous to the recording of data on magnetic, optical and magneto-optical disks. Asperities that represent user data can be formed in data sectors 64. Servo sectors 66 may also be provided in which asperities representing information analogous to magnetic disk servo fields are formed for positioning an asperity reader and/or writer relative to the disk medium 60. FIG. 7A represents an enlarged plan view of a flexible tape medium 70A wherein the asperities 20 shown in FIG. 2 are recorded in linear tracks 72A in a manner analogous to the linear recording of data on magnetic tape. Asperities that represent user data can be formed in data sectors 74A. Servo sectors 76A may also be provided in which asperities representing information analogous to magnetic tape servo fields are formed for positioning an asperity reader and/or writer relative to the tape medium 70A. FIG. 7B represents an enlarged plan view of a flexible tape medium 70B wherein the asperities 20 shown in FIG. 2 are recorded in helical tracks 72B in a manner analogous to the helical recording of data on magnetic tape. Asperities that represent user data can be formed in data sectors 74B. Servo sectors 76B may also be provided in which asperities representing information analogous to magnetic tape servo fields are formed for positioning an asperity reader and/or writer relative to the tape medium 70B. The media 60, 70A and 70B may be either uncoated or coated using conventional materials.

A. Asperity Disk Drive

Figure 8:
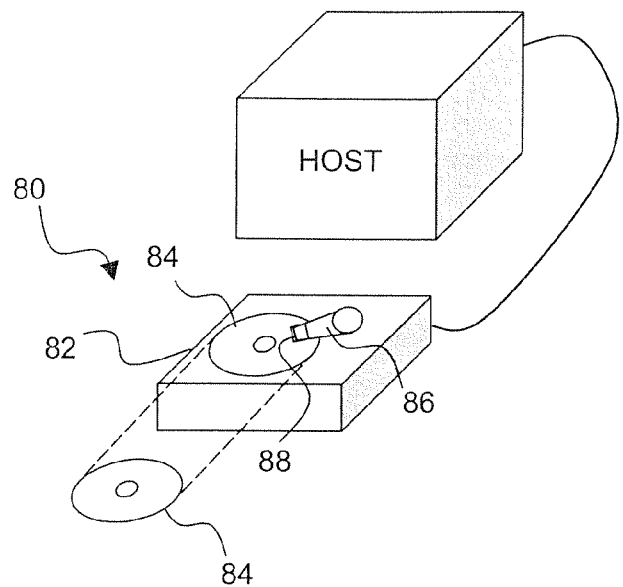
FIG. 8 is a perspective view of an asperity disk drive constructed in accordance with the present invention.

Turning now to FIG. 8, an exemplary asperity disk drive 80 is shown that may be constructed in accordance with the principles of the present invention. The disk drive 80 includes a base casting 82 that supports drive components (not shown) for spinning a disk 84 at high rotational speed. The disk 84 can be either fixedly mounted in the disk drive 80, or it could be removable. If the disk 84 is fixed, other disks (not shown) may also be carried by the drive components to form a spaced vertically stacked disk platter arrangement. The disk 84 is formed from a suitable disk substrate that is capable of being configured with a pattern of asperities, as shown in FIG. 6. For example, disk 84 could be made from the same material used to manufacture magnetic, optical or magneto-optical disks.

Data access to the disk 84 is achieved with the aid of an actuator/suspension 86 that is mounted for rotation relative to the base casting 82. The free end of the actuator/suspension 84 mounts a transducer-carrying slider 86 that mounts an asperity transducer (not shown in FIG. 8) constructed in accordance with the present invention. As described in more detail below in connection with FIG. 10, this asperity transducer can be implemented using the asperity reader 24 of FIG. 2, or any of the asperity writers 50A-50D of FIGS. 5A-5D, or as a merged head that combines an asperity reader and an asperity writer so as to be capable of performing asperity read/write operations. As is conventional, the actuator/suspension 86 moves the slider 88 generally radially across the surface of the disk 84 so that the transducer is able to trace concentric data tracks on the disk. As further described in more detail below relative to FIG. 10, the asperity disk drive 80 further includes onboard electronics that allow it to communicate with a host, such as a general purpose computer or other information processing system.

B. Asperity Tape Drive

Figure 9A:
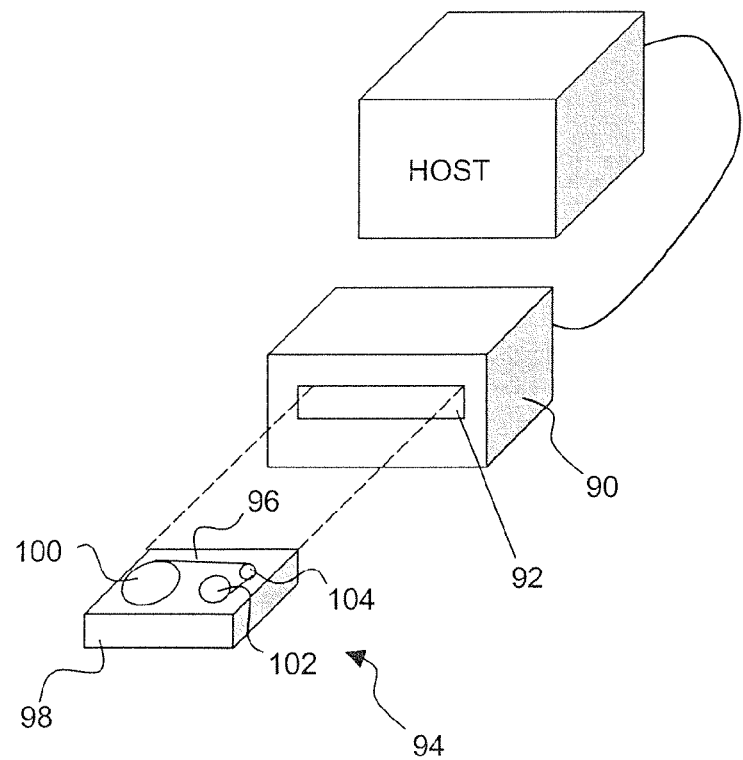
FIG. 9A is a perspective view of an asperity tape drive constructed in accordance with the present invention that employs linear information encoding.

Turning now to FIG. 9A, an exemplary asperity tape drive 90 is shown that may be constructed in accordance with the principles of the present invention. The asperity tape drive 90 includes a slot 92 for receiving a tape cartridge 94 into engagement with an internal tape interface system (not shown). The tape cartridge 94 carries a tape medium 96 within a housing 98. The tape medium 96 is formed from a suitable tape substrate that is capable of being configured with a linear pattern of asperities, as shown in FIG. 7A. For example, tape medium 96 could be made from the same material used to manufacture magnetic recording tape.

The tape medium is carried on a supply reel 100 and feeds a take up reel 102 around an optional capstan tape guide roller 104. Although not shown, the internal tape interface system within the tape drive 90 conventionally includes a pair of drive motors that are adapted to engage and drive the supply reel 100 and the take-up reel 102 when the cartridge 94 is inserted in the slot 92. In addition, an asperity transducer (not shown in FIG. 9A) will be operatively positioned relative to the tape medium 96 when the cartridge 94 is so engaged. As described in more detail below in connection with FIG. 10, this asperity transducer can be implemented using the asperity reader 24 of FIG. 2, or any of the asperity writers 50A-50D of FIGS. 5A-5D, or as a merged head that combines an asperity reader and an asperity writer so as to be capable of performing asperity read/write operations. As further described in more detail below relative to FIG. 10, the asperity tape drive 90 additionally includes onboard electronics that allow it to communicate with a host, such as a general purpose computer or other information processing system.

Figure 9B:
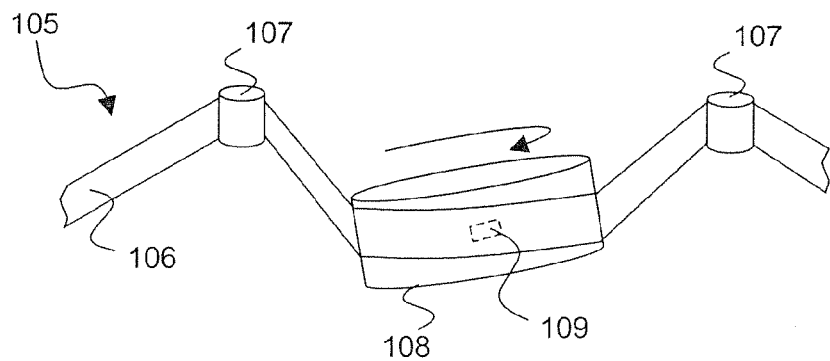
FIG. 9B is a perspective view of an asperity tape drive constructed in accordance with the present invention that employs helical information encoding.

FIG. 9B illustrates an alternative asperity tape drive 105 that employs a helical encoding scheme in which a tape medium 106 streams around guide rollers 107 and across the surface of an obliquely angled rotating drum 108. An asperity transducer 109 is operatively mounted on the drum 108 to scan the tape medium 106 in helical fashion (as per FIG. 7B). As described in more detail below in connection with FIG. 10, the asperity transducer 109 can be implemented using the asperity reader 24 of FIG. 2, or any of the asperity writers 50A-50D of FIGS. 5A-5D, or as a merged head that combines an asperity reader and an asperity writer so as to be capable of performing asperity read/write operations. As further described in more detail below relative to FIG. 10, the asperity tape drive 105 additionally includes onboard electronics that allow it to communicate with a host, such as a general purpose computer or other information processing system.

C. Asperity Drive Subsystem

Figure 10:
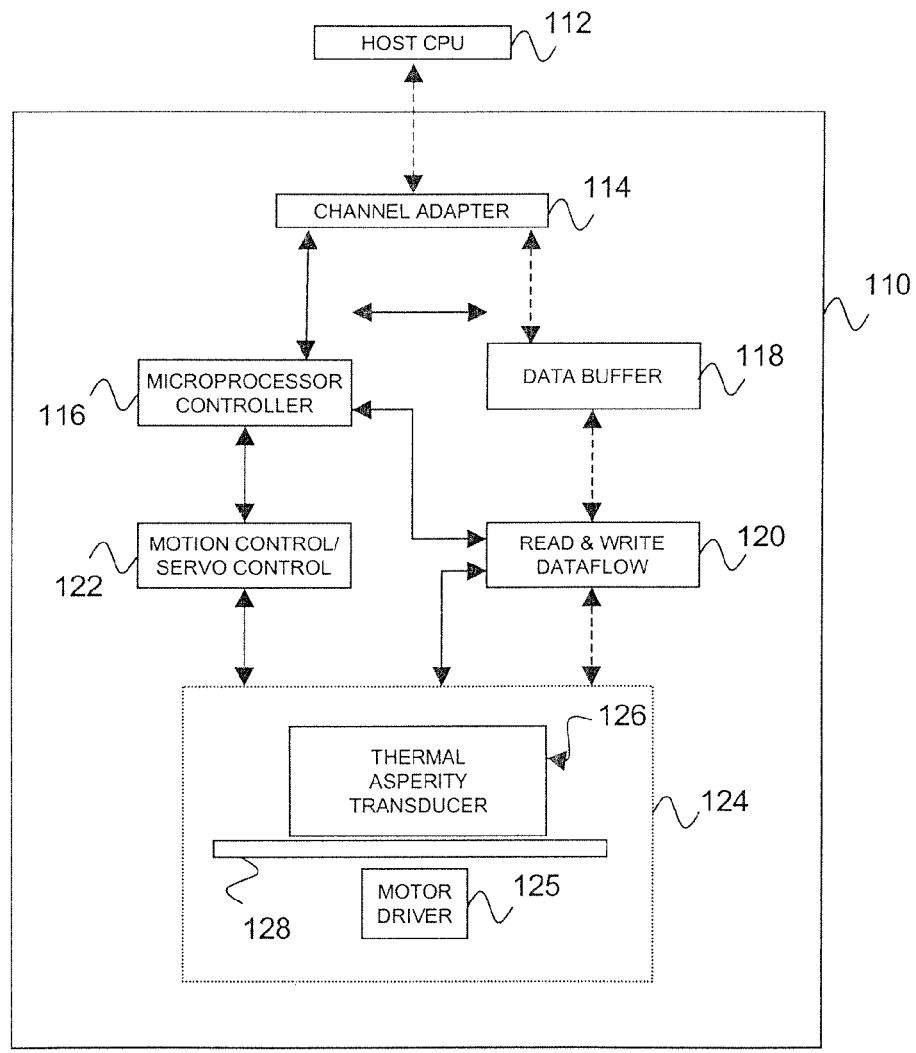
FIG. 10 is a functional block diagram showing an asperity subsystem that may be incorporated in an asperity data storage system of the invention, such as the disk drive of FIG. 8 or the tape drive of FIG. 9.

Turning now to FIG. 10, a functional block diagram illustrates an exemplary asperity drive subsystem 110 that may be used to implement either the asperity disk drive 80 of FIG. 8, the asperity tape drive 90 of FIG. 9A, or the asperity tape drive 105 of FIG. 9B. The asperity drive subsystem 110 includes plural components providing control and data transfer functions for reading and/or writing host data on an asperity disk or tape medium in one or more tracks for the benefit of a host 112. By way of example only, such components may include a channel adapter 114, a microprocessor controller 116, a data buffer 118, a read/write data flow circuit 120, a motion control/servo control system 122, and a media interface system 124 that includes a motor driver unit 125 and an asperity transducer 126.

The microprocessor controller 116 provides overhead control functionality for the operations of all other components of the asperity subsystem 110. As is conventional, the functions performed by the microprocessor controller 116 can be programmed via microcode routines (not shown) according to desired storage system operational characteristics. During data write operations (with all dataflow being reversed for data read operations), the microprocessor controller 116 activates the channel adapter 114 to perform the required host interface protocol for receiving an information data block. The channel adapter 114 communicates the data block to the data buffer 118 that stores the data for subsequent read/write processing. The data buffer 118 in turn communicates the data block received from the channel adapter 114 to the read/write dataflow circuitry 120, which formats the device data into physically formatted data that may be recorded on an asperity storage medium. The read/write dataflow circuitry 120 is responsible for executing all read/write data transfer operations under the control of the microprocessor controller 116. Formatted physical data from the read/write circuitry 120 is communicated to the media interface system 124.

As stated, the media interface system 124 includes a motor driver unit 125 and an asperity transducer 126. The motor driver unit 125 contains components for controlling the movement between an asperity medium 128, be it a disk, tape or fixed medium, and an asperity transducer 126 in operational proximity thereto. For example, if the asperity drive subsystem 110 is implemented in the disk drive 80 of FIG. 8, the drive components of the media interface system 124 will be controlled by the motion control system 122 and the motor driver circuit 125 to execute such actions as spinning the disk medium 84 up and down, and manipulating the transducer/suspension 86 to position the transducer-carrying slider 88 during such track positioning operations as seek, settle and track following. Note that conventional servo-control techniques can be used with servo sectors recorded as asperity servo information. By way of further example, if the asperity drive subsystem 110 is implemented in the linear tape drive 90 of FIG. 9A, the drive components of the media interface system 124 will be controlled by the motion control system 122 and the motor driver circuit 125 to execute such actions as forward and reverse recording and playback, rewind and other tape motion functions. In addition, in a multi-track tape drive system, the motion control system 122 will transversely position the tape drive's asperity transducer(s) relative to the direction of longitudinal tape movement in order to read or write data in a plurality of tracks. Note that head servo-control can be accomplished using tape edges and/or tracks with prewritten asperity servo information. Compensating for tape width changes can be accomplished via in situ calibration prior to reading.

Figure 11A:
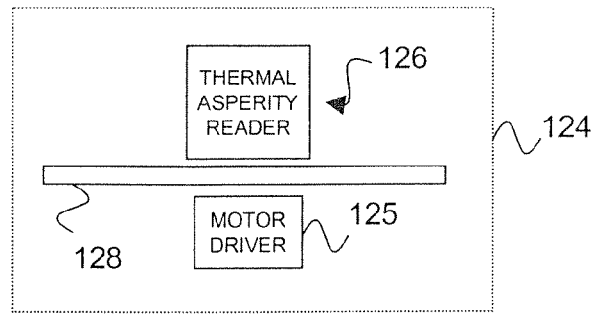
FIGS. 11A, 11B and 11C are functional block diagrams showing the use of different kinds of asperity transducers in the asperity subsystem of FIG. 10.
Figure 11B:
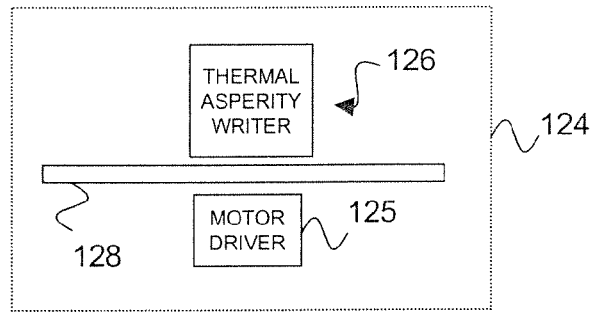
Figure 11C:
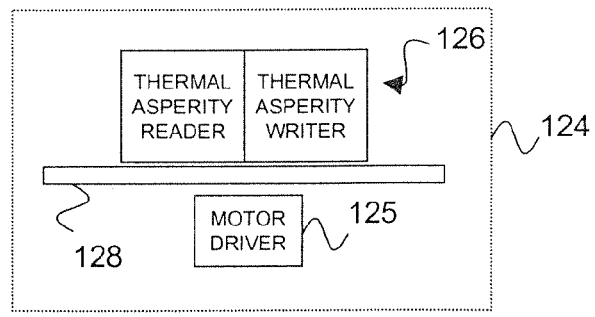

The asperity transducer 126 can be implemented as part of the transducer carrying slider 88 in the asperity disk drive 80 of FIG. 8, or as a tape head transducer in the asperity tape drive 90 of FIG. 9A or the tape drive 105 of FIG. 9B. In each environment, the asperity transducer unit 126 can embody (1) an asperity reader 130 of the type shown and described in connection with FIGS. 3, 4A and 4B, or (2) an asperity writer 140 of the type shown in FIGS. 5A-5B, or (3) both. In the first configuration, which is shown in FIG. 11A, a read-only capability would be provided in a manner analogous to a conventional CDROM drive. In the second configuration, which is shown in FIG. 11B, a write-only capability would be provided in a manner that is analogous to conventional devices used to produce prerecorded storage media. In the third configuration, which is shown FIG. 11C, a read-write capability would be provided in a manner analogous to a conventional magnetic disk or tape drive or an optical or magneto-optical disk drive with write-once-read-many data recording capability.

V. Conclusion

Accordingly, an asperity data storage system, method and medium have been disclosed. Applications for the inventive subject matter include, but are not limited to, those requiring immunity from the degrading effects that magnetic fields can have on conventional magnetic storage media, applications involving high readback speeds (which actually increase asperity detection), and applications involving Write-Once-Read-Many (WORM) media that require long shelf life. The achievable asperity areal densities that can be read back by an asperity reader as described above are expected to be on the order of $1\times10^6$ to $1\times10^7$ asperities per square inch, or better. The limit is set by the asperity characteristics and by the thermal response of the asperity reader. When the asperities are closer together than several micrometers, the cooling pulses will begin to overlap, making decoding more difficult. In general, it is advantageous to have the sensor dimensions smaller than those of the asperities for ease of decoding. Because the asperities are written along discrete tracks, the track pitch needs to be large enough to prevent two sensors from detecting the same asperity. Track pitch and linear densities are on the order of 10 micrometers.

While various embodiments of the invention have been shown and described, it should be apparent that many variations and alternative embodiments could be implemented in accordance with the teachings herein. For example, in addition to using an asperity reader as disclosed herein for reading asperity patterns representing stored information, such a reader could be used for characterizing asperity distributions on magnetic recording media, where asperities are generally undesirable. The disclosed asperity reader could be used, for example, in a tape transport system that runs the tape media at relatively high speed, such as 10-20 meters/second. This high speed makes some asperities more easily detected and counted. This could help a manufacturer understand and monitor media surface quality.

It is understood, therefore, that the invention is not to be in any way limited except in accordance with the spirit of the appended claims and their equivalents.

What is claimed is:

1. A data storage system, comprising:
    an asperity transducer for thermally interacting with a data storage medium and adapted to store non-servo user data as an information-encoded pattern of asperities thereon;
    said asperity transducer having a thermal diffusivity and time constant for temperature change that is selected to produce a desired thermal pulse amplitude;
    a drive system adapted to produce relative motion between said data storage medium and said asperity transducer; and
    channel circuitry adapted to process electrical signals corresponding to said asperities as stored information.

2. A system in accordance with claim 1 in combination with a data storage medium having an information-encoded pattern of nano-imprinted, nano-indented or nano-particle deposited asperities stored thereon representing non-servo user data.

3. A system in accordance with claim 2 further including transducer positioning circuitry adapted to control a positional relationship between said asperity transducer and said data storage medium using asperities on said data storage medium for reference.

4. A system in accordance with claim 1 wherein said system comprises a data retrieval system and said asperity transducer comprises an asperity reader.

5. A system in accordance with claim 4 wherein said asperity reader comprises a sensor positioned relative to an air bearing surface of said reader, said sensor having one or more of (1) a cross-sectional area at said air bearing surface configured to provide said selected thermal diffusivity and time constant for temperature change, (2) a heat sink shield on one or more sides of said sensor at said air bearing surface to provide said selected thermal diffusivity and time constant for temperature change, or (3) a heat sink shield on one or more sides of said sensor that extends to said air bearing surface and said sensor being recessed from said air bearing surface to provide said selected thermal diffusivity and time constant for temperature change.

6. A system in accordance with claim 1 wherein said system comprises a data recording system and said asperity transducer comprises an asperity writer.

7. A system in accordance with claim 6 wherein said asperity writer comprises one of a laser writer, a imprinting writer, a laser print head writer, and an ink jet print head writer.

8. A system in accordance with claim 1 wherein said asperity transducer comprises an asperity reader and an asperity writer.

9. A system in accordance with claim 2 wherein said system comprises an asperity disk drive in which said data storage medium comprises a rotatable disk and said asperity transducer is mounted on a slider carried by an actuator arm.

10. A system in accordance with claim 2 wherein said system comprises an asperity tape drive in which said data storage medium comprises a streamable tape and said asperity transducer is mounted on a tape head for either linear or helical scanning.

* * * * *